Inventor
William M. Barret

Nov. 6, 1951 W. M. BARRET 2,573,682
MEANS AND METHOD FOR ELECTROMAGNETIC-WAVE INVESTIGATIONS
Original Filed March 17, 1941 6 Sheets-Sheet 5

Inventor
William M. Barret

Patented Nov. 6, 1951

2,573,682

UNITED STATES PATENT OFFICE 2,573,682

MEANS AND METHOD FOR ELECTROMAGNETIC-WAVE INVESTIGATIONS

William M. Barret, Shreveport, La., assignor to Engineering Research Corporation, Shreveport, La., a corporation of Louisiana Original application March 17, 1941, Serial No. 383,770, now Patent No. 2,426,918, dated September 2, 1947. Divided and this application March 24, 1945, Serial No. 584,675

4 Claims. (Cl. 175—182)

This invention relates to the art of electrical prospecting. More particularly, the herein disclosed prospecting system provides apparatus and methods which employ electromagnetic waves in determining useful subsurface geologic information, and which furnish important data to guide the operation of all electromagnetic geophysical methods utilizing wave propagation.

The present application is a division of applicant's parent application Serial No. 383,770, filed March 17, 1941, and entitled "Means and Methods for Electromagnetic-Wave Investigations," now Patent No. 2,426,918, issued September 2, 1947, under the title "Method for Electromagnetic-Wave Investigations of Earth Formations."

One of the objects of the present invention is to furnish a useful technique for determining the depth of subsurface zones which reflect electromagnetic waves, and thereby map the configuration of said zones.

Another object of the invention is to provide a reliable means for determining the presence, depth and extent of underground masses which reflect electromagnetic waves.

Another object is to furnish a practical technique for locating and defining electrical discontinuities in buried strata, such as occur in a porous stratum at the boundary between salt water and petroleum, or when a reflecting zone "wedges out."

Another object is to provide an effective means for locating and defining the character of geologic faults.

An additional object is to make available a satisfactory means for locating and defining buried masses whose electrical characteristics differ sufficiently from those of the surrounding media, such as a buried salt dome, igneous plug or metalliferous vein.

An additional object is to furnish a technique for determining the optimum frequency to be employed in conducting electromagnetic-wave investigations.

An additional object is to provide a means for finding the frequency band or bands in the electric spectrum at which absorption of energy increases.

A further object is to make available apparatus and methods for determining other useful information for which the invention is adapted.

The present case is a continuation in part of applicant's earlier filed and now abandoned application, Serial No. 304,762, filed November 16, 1939, which discloses and claims specific forms of the invention disclosed and generically claimed herein.

The art and literature of electrical prospecting describe numerous geophysical methods which are postulated on the use of electromagnetic waves, and whose operations presuppose wave propagation in accordance with elementary optical principles. The earlier methods have been characterized almost invariably by two fundamental fallacies. One of these fallacies is the erroneous supposition that the attenuation suffered by an electromagnetic wave in traversing partially conducting media necessarily increases exponentially with the frequency of the wave. This misconception has arisen from the improper application of Maxwell's classical field equations. Based on Maxwell's equations, Haas ("Introduction to Theoretical Physics," vol. 1, p. 291, 1933, Constable and Co., London) derived the following expression for the attenuation of a plane wave traveling in a medium which has the properties of both a dielectric and a conductor:

$$E_x = E_0 e^{-\frac{2\pi k x}{\lambda}} \quad (1)$$

where $E_0$ is the amplitude of the incident wave, $E_x$ is the amplitude of the wave after traveling the distance $x$ through the medium, $e$ is the base of natural logarithms, $\lambda$ is the wave length in free space, and $k$, the absorption factor, is given by:

$$k = \sqrt{\frac{\mu}{2}\left(\sqrt{\epsilon^2 + \frac{4\sigma^2}{f^2}} - \epsilon\right)} \quad (2)$$

where $\mu$ is the magnetic permeability (approximately 1 for most sedimentary materials), $\epsilon$ is the dielectric constant, $\sigma$ is the specific conductivity and $f$ is the frequency of the waves.

Equation 1 predicts that the amplitude of the wave decreases exponentially as the wave length decreases, or conversely, as the frequency increases, and this interpretation has resulted in the customary use of low-frequency waves, on the presumption that the attenuation loss would be decreased and the effective working depth thereby increased. This assumes, however, that the absorption factor $k$ is independent of frequency, and from Equation 2 it necessarily follows that the dielectric constant and conductivity of the media have likewise been considered independent of frequency.

It is known that most dielectric materials are characterized by selective-frequency absorption, that is, their absorption of electromagnetic radiations varies with the frequency of the radiations. A familiar example of this effect is glass, which transmits visible light (electromagnetic radiations), but absorbs radiations in the ultra-violet and infra-red portions of the spectrum. Glass is thus transparent to a particular spectral band, but opaque to radiations of higher or lower frequency. It is even suggested by Lewis ("Physics," A. W. Duff, p. 632, 1937, The Blakiston Co., Philadelphia) that all substances would show selective absorption if the investigations were extended over a sufficient frequency range.

Many years of theoretical, laboratory and field research have demonstrated conclusively that the partially conducting media comprising the geologic section likewise exhibit selective absorption, and that for a given section there is an optimum frequency at which the ratio of transmitted to absorbed radiations is a maximum. Rigorous laboratory tests with geologic media have disclosed the presence of the characteristic transmission and absorption bands identified with materials exhibiting anomalous dispersion, and have brought out the notable fact that at particular frequencies highly conducting media can show negligible loss angles, and consequently, at these frequencies the media would cause no appreciable attenuation of an electromagnetic wave.

This discovery brings to light a new phenomenon which is directly opposed to conventional conceptions, and alters completely the viewpoint toward the possibilities offered by alternating-current geophysical methods. It means that by the proper choice of frequency, geologic media can be rendered essentially transparent for electromagnetic waves. This does not imply that Equation 1 or 2 is incorrect. The disagreement with the conventional belief that the attenuation necessarily increases exponentially with frequency arises from the general misconception that has prevailed concerning the effective electrical properties of geologic media when traversed by electromagnetic waves of particular frequencies.

Field experiments further disclose the fact that the optimum frequency for one geologic area differs from that of another, owing to changes that occur from place to place in the electrical characteristics of the stratigraphic section. And, moreover, in the same area, the optimum frequency for one depth of investigation differs from that of another. Accordingly, in prospecting by means of electromagnetic waves it becomes of importance to determine the optimum frequency for the particular area and depth of investigation.

The present invention makes it readily possible to find the optimum frequency for any given area and for any workable depth of investigation. And conversely, it provides a useful means for determining the frequency or frequencies which cause an increase in the amount of electric energy absorbed.

It was stated previously that two fundamental fallacies are evident in most of the earlier methods utilizing electromagnetic-wave propagation. The low-loss transmission of waves at particular frequencies has been shown to overcome the accepted notion that the attenuation necessarily increases exponentially with frequency, but it remains to consider the second of these fallacies, which deals with the mode of wave travel assumed by the previous methods.

It has been the common practice, with those methods predicated on wave reflection, to propagate waves from a sending device to a buried reflecting mass, and to detect the reflected waves with a receiving device which is laterally disposed with respect to the sending device. The separation at the earth's surface between the sending and receiving devices has been by arbitrary known distances, and the wave path has been defined by a straight line from the sending device to the underlying reflecting mass (where the angles of incidence and reflection are equal), and thence by a straight line to the receiving device. In other words, the supposition has prevailed that the wave propagation was represented by an inverted triangle having its apex at the reflector, and the sender and receiver at the extremities of its base on the ground surface. The definition of the presumed triangular wave path has required, for the operation of the previous methods, that the separation be known between the said sending and receiving devices.

It is proposed in the present case to demonstrate that the wave path described above, and presupposed by many of the earlier electromagnetic methods, is totally incorrect, and hence any method which postulates this mode of wave travel can not operate as claimed by its inventer. It is further proposed to describe for the first time the path followed by electromagnetic waves in partially conducting media, and to show how the reflection of the waves by strata having anomalous indices of reflection can be utilized to obtain much useful subsurface information.

Figure 6:
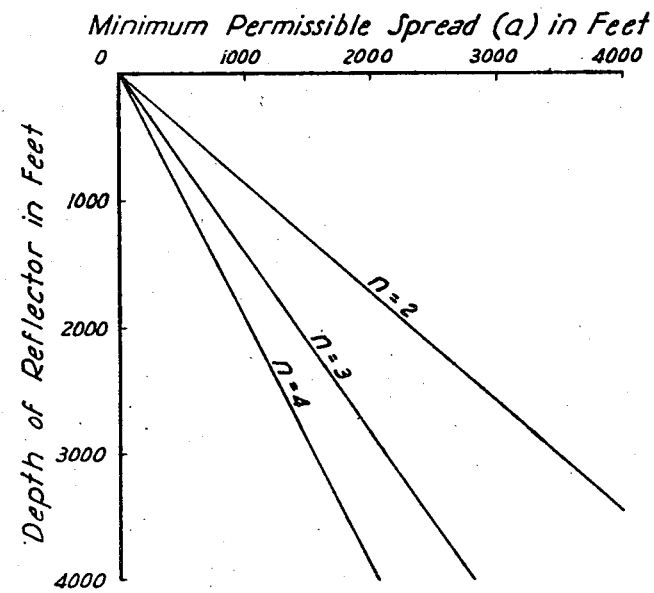

Fig. 6 presents a graphical representation of the relation between the depth of a subsurface reflector and the minimum permissible spread that can be employed in mapping the said reflector, for three values of the refractive index.

Figure 7:
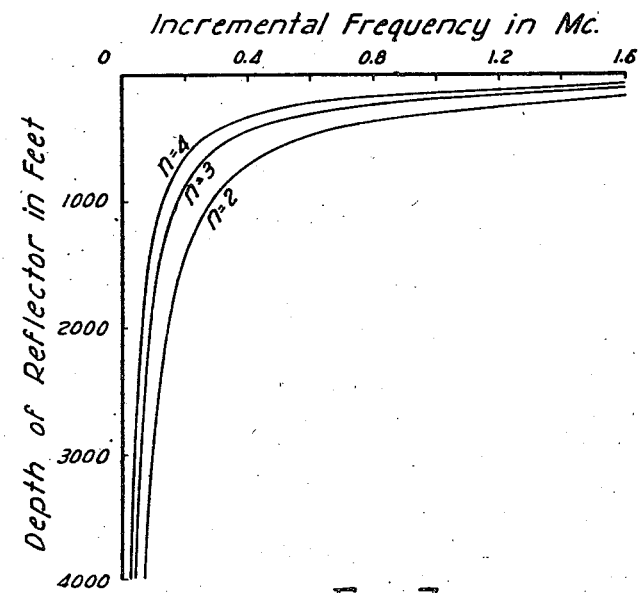

Fig. 7 displays graphs, for three values of the refractive index, which illustrates the relation between the depth of a subsurface reflector and the observed incremental frequency.

Figure 8:
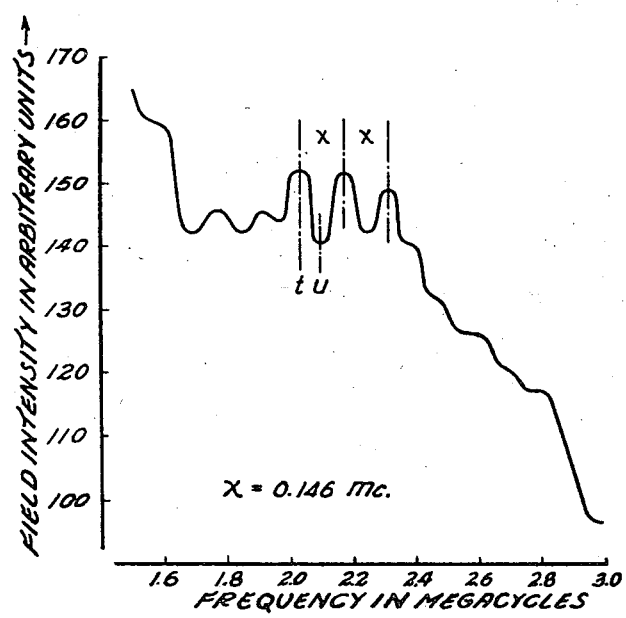

Fig. 8 illustrates a frequency-field intensity curve that was obtained in an area where the principal reflector lies at a depth of 1,440 feet.

Figure 9:
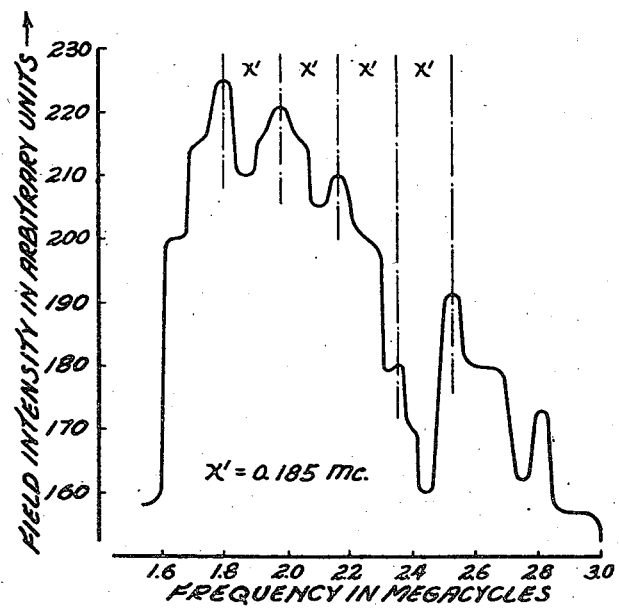

Fig. 9 shows a frequency-field intensity curve secured in an area where the depth of the principal reflector is 1,176 feet.

Figure 1:
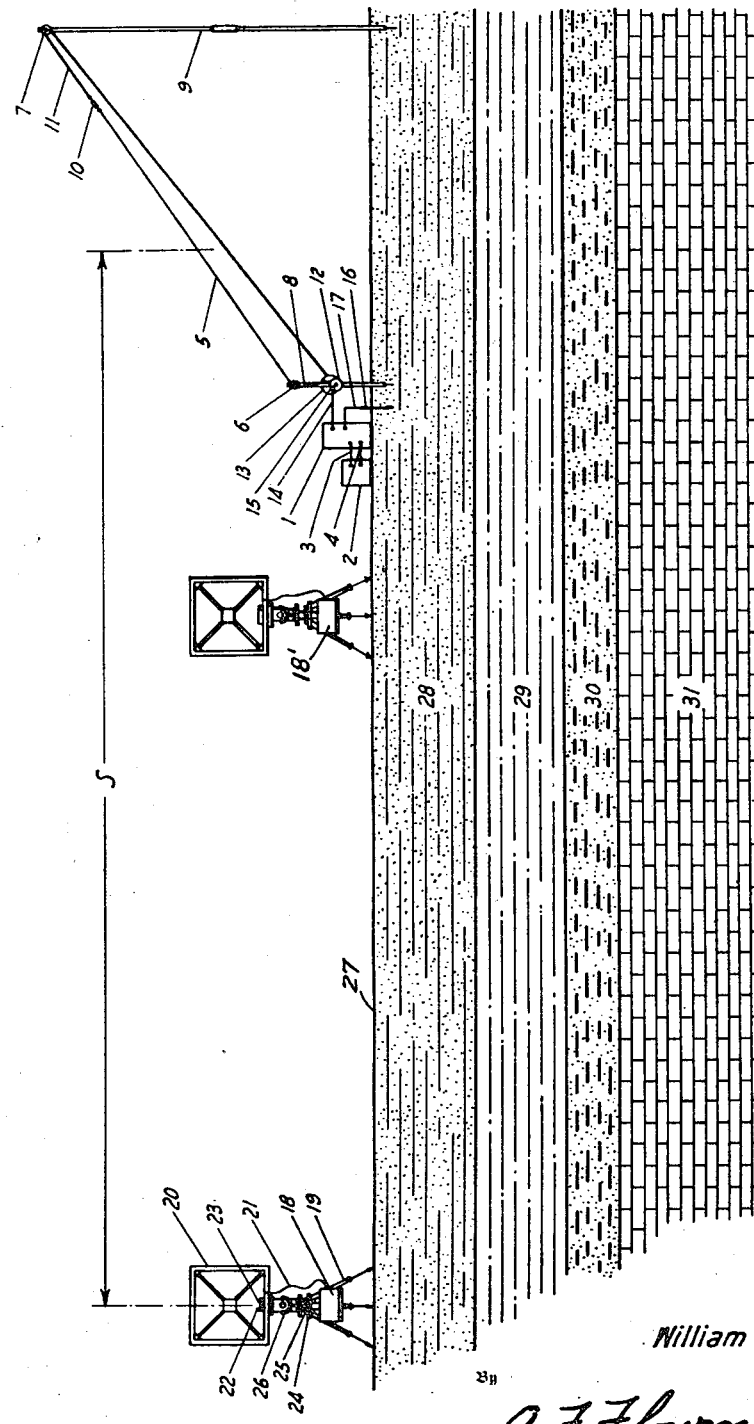
Fig. 1 shows in diagrammatic form the principal electrical components embodied in this invention, and a sectional view of a part of the underlying earth.

Referring to Fig. 1 by numerals, 1 indicates a generator of electromagnetic waves, termed the exciter, 2 the power source for energizing the said exciter, which may be a gasoline-driven alternator having good voltage regulation, 3 and 4 the wires for transferring electrical energy from the power source 2 to the exciter 1, 5 the preferred form of antenna, which is supported by the pulleys 6 and 7 attached to the poles 8 and 9, 10 the insulator that connects the antenna 5 to the rope 11, 12 and 13 the reels (each provided with crank and ratchet) for controlling the length and tension of the antenna 5 and rope 11 respectively, 14 the wire connecting the said exciter and the said antenna through the removable contact 15 attached to the reel 12, 16 the metallic rod for making intimate electrical contact with the earth, and 17 the wire joining the "ground" 16 with the exciter 1. The receiver 18 is supported by the tripod 19, and energized by the loop 20, which may be turned about a horizontal and a vertical axis, 21 is the dual-conductor cable connecting the receiver 18 and loop 20, 22 is the bull's-eye level and 23 the compass for leveling and orienting the said loop, 24 the rotatable tripod head that supports the graduated horizontal scale 25 and graduated vertical scale 26, said scales providing means for finding the angles made by the plane of the loop 20 with horizontal and vertical reference planes. The surface of the earth is denoted by 27, and in descending order the formations 28, 29, 30 and 31 comprise the stratigraphic section illustrated, the said formation 30 representing a zone which reflects electromagnetic waves, such as a salt-water stratum.

Figure 2:
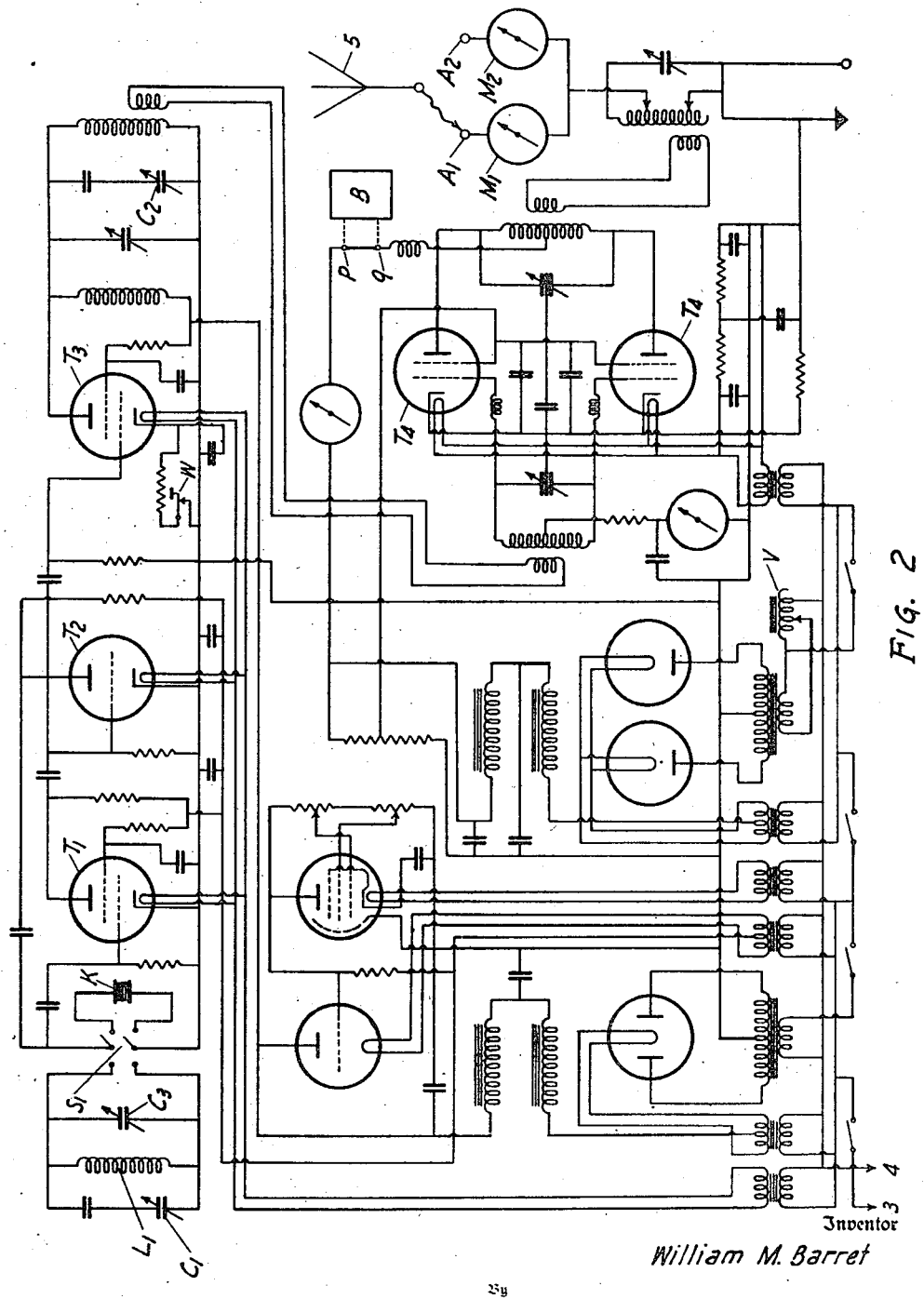
Fig. 2 is a circuit diagram of the preferred form of exciter.

The exciter 1 employed with the herein described invention emits electromagnetic energy at a controlled power level, the frequency of the emission being continuously variable and accurately determinable throughout the working range. In Fig. 2 appears the circuit diagram of the preferred form of unmodulated exciter, which comprises a variable-frequency oscillator, a buffer amplifier, a final amplifier, an antenna-matching network, and a crystal-controlled oscillator for checking the frequency calibration of the variable-frequency oscillator.

The said exciter is energized by the external power source 2 (Fig. 1) through the wires 3 and 4. When $L_1$ is placed in circuit by throwing the switch $S_1$ to the proper position, the tubes $T_1$, $T_2$ and their associated circuit elements become a Franklin oscillator whose frequency is controlled by the setting of the ganged condensers $C_1$ and $C_2$, and whose output is used to drive the buffer-amplifier tube $T_3$. A calibration curve, obtained with the aid of a heterodyne-frequency meter, shows the relation between the frequency of the Franklin oscillator and the dial setting of the condensers $C_1C_2$. When the switch $S_1$ is in the alternative position, the crystal K is in circuit and the tubes $T_1$ and $T_2$, with the circuit elements associated directly therewith, become a crystal-controlled oscillator, and the operating frequency of the exciter then is fixed by the said crystal. By using a monitoring receiver the crystal oscillator may be employed to standardize the frequency calibration of the Franklin oscillator, by means of the vernier condenser $C_3$, which compensates for any drift in frequency of the said oscillator. The power supply for the variable-frequency oscillator and the crystal oscillator is of a type that maintains its output voltage constant for normal variations of input voltage and load.

The final amplifier and its power supply is a conventional push-pull arrangement, deriving its input through the link circuit between the buffer-amplifier tube $T_3$ and the tubes $T_4$, which are coupled to the antenna 5 by a matching network. The said antenna may be connected to either terminal $A_1$ or $A_2$, so that the radiation meter, $M_1$ or $M_2$, having the most advantageous range can be used. The reading of the radiation meter may be maintained at the desired value by manipulating the continuously variable auto-transformer V, which controls the voltage impressed on the plates of the final-amplifier tubes $T_4$.

The key W provides a means for sending interrupted-constant-wave signals to the receiver 18 (Fig. 1), to facilitate field operations. Two-way communication between the units is completed through the use of an accessory transmitter at the said receiver, and a companion communication receiver at the exciter 1, each operating on a fixed frequency.

Figure 3:
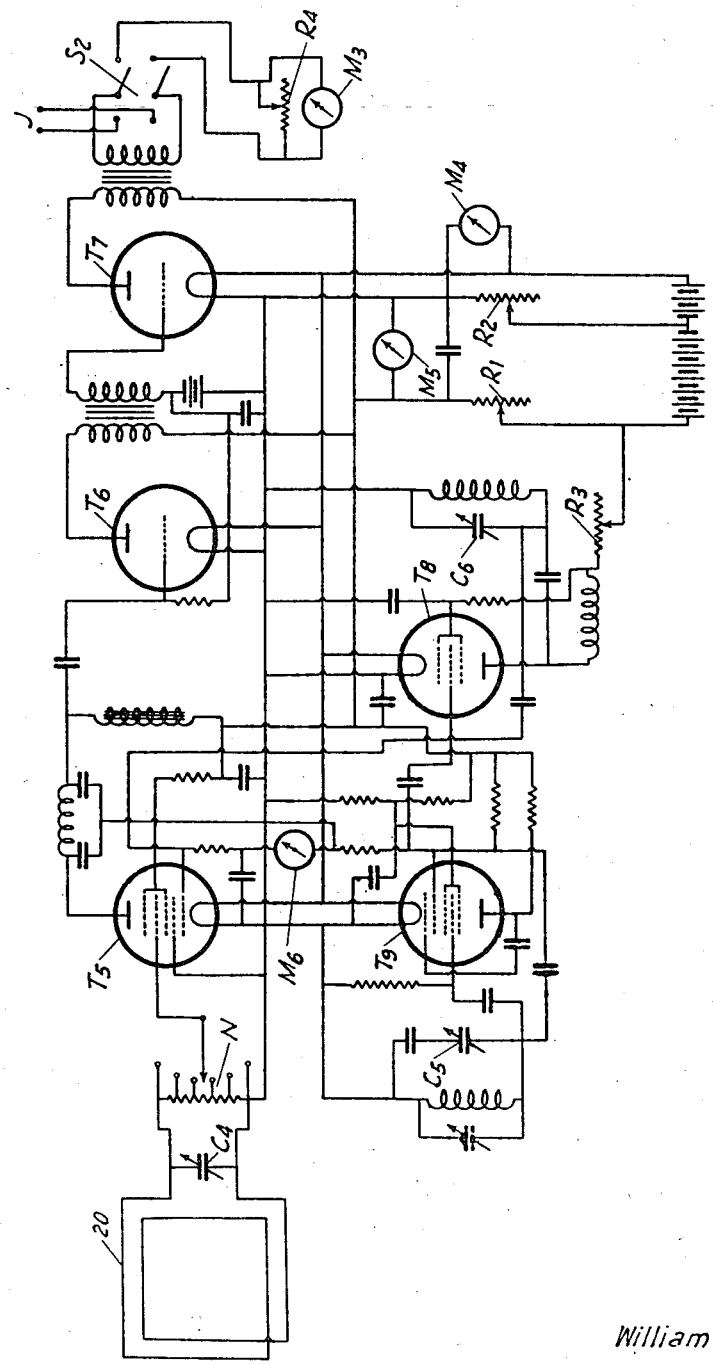
Fig. 3 is a circuit diagram of the preferred form of receiver.

The receiver 18 used with this invention is self contained except for its loop antenna 20, and is light, rugged and readily portable. It may be designed to detect either modulated or unmodulated waves, but in the preferred form of operation unmodulated waves are used, and Fig. 3 shows the circuit diagram of the preferred form of receiver. It is of the heterodyne type, utilizing an audible beat note that first appears in the mixer tube $T_5$. The incoming signal is passed from the loop 20, which is tuned by the variable condenser $C_4$, through the calibrated attenuator N, which permits known fractional parts of the voltage appearing in the said loop to be impressed on the said mixer tube, thence to the sharply tuned audio amplifier, comprising tubes $T_6$, $T_7$ and their associated circuits, and finally into the output meter $M_3$, whose readings give the field intensity at the said loop when multiplied by the constant for the attenuator tap used. The output of the receiver can be diverted by means of the switch $S_2$ to the jack J, into which headphones may be plugged for telegraphic reception from the exciter unit; for checking the operation of the receiver, or for the purpose of determining if waves are being picked up by the said receiver from sources other than the said exciter.

When making an observation with the receiver the loop circuit is tuned by $C_4$ to resonate at the signal frequency, the filament, plate and injection voltages shown by meters $M_4$, $M_5$ and $M_6$, respectively, are adjusted to predetermined values by means of $R_1$, $R_2$ and $R_3$, the injection voltage being taken from the buffer-amplifier $T_8$, which is driven by the heterodyne oscillator $T_9$; the shunt $R_4$ is set to give the maximum reading of the output meter $M_3$, and the heterodyne oscillator is adjusted by the ganged condensers $C_5C_6$ to a frequency equal to the signal frequency plus (or minus) the resonant frequency of the said amplifier, this condition being indicated when the maximum reading of $M_3$ is obtained. The oscillator-amplifier combination illustrated enables a wide range of frequencies to be covered by simultaneously varying the ganged condensers $C_5C_6$, without the use of switches and with easily controlled output.

The description of preferred forms of the exciter and receiver embodied in this invention now is complete. These forms comprise an exciter whose unmodulated output may be varied over wide ranges of frequency and amplitude but which can be maintained within close tolerances when making an observation at fixed frequency, and a comparatively high-gain variable-frequency heterodyne-type receiver, whose amplification constant may be maintained at a precise level for any position of its calibrated input attenuator. The specification and drawings dealing with the exciter and receiver are to be regarded as illustrative and not restrictive, for it is obvious to those versed in the art that optional forms of exciters and receivers may be utilized to carry out the purpose of this invention.

For example, an exciter and receiver using various types of modulated waves can be employed successfully in practicing this invention. The design and construction of oscillators and receivers for use with modulated waves is well known to those skilled in the radio art, but brief reference will be made here to the apparatus needed to utilize one of the most important forms of modulation, namely, amplitude modulation. The exciter and receiver already described can be easily modified to make use of amplitude modulation. In the case of the exciter, it is only necessary to remove the link connecting points $p$ and $q$ (Fig. 2), and insert conventional components (indicated by B) for modulating the plate voltage of the final-amplifier tubes $T_4$. The receiver shown in Fig. 3 can be readily modified by the simple expedient of removing tubes $T_8$ and $T_9$ and then recalibrating the unit, though it is to be understood that a more sensitive and selective receiver would result from the addition of a tuned radio-frequency amplifier ahead of tube $T_5$.

The theory underlying the operation of the herein described invention will be understood from the discussion which follows.

In practice, the exciter 1 and receiver 18 are set up in the area to be examined (Fig. 1), and the spread S made a sufficient amount to obtain the required working depth, it being understood that increasing spread corresponds to increasing depth of investigation. When the exciter and receiver are energized, and the power level of the exciter adjusted to a suitable value, waves will be propagated from the exciter to the receiver, and a selected parameter of the field associated with the waves at the loop 20 may be measured with the receiver 18. In the preferred form of operation, the receiver reading is obtained when the plane of the said loop is substantially vertical and directed toward the antenna 5. In this position the loop is energized by the vertical component of the electric field, which is commonly referred to as the "field intensity."

A part of the electrical energy reaching the receiver 18 through the loop 20 is in the form of "air waves," which travel along and above the ground between the radiator 5 and the loop 20, and another part arrives in the form of "ground waves," which travel at considerable depths, depending largely on the magnitude of the spread S.

Figure 4:
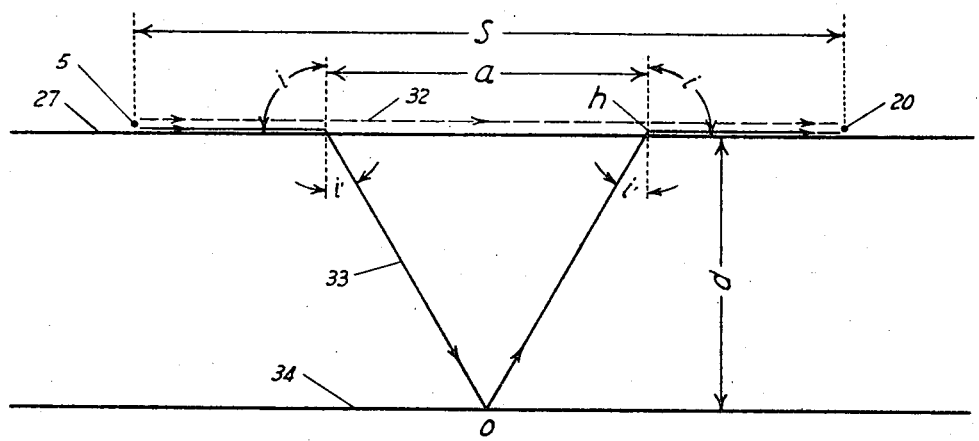
Fig. 4 shows the disposition of the exciter and receiver when employed to determine the depth of a single subsurface reflector, together with the ray paths for the air and ground waves, and the notations used in describing the operation of the invention.

Consider next the mechanism that controls the path traveled by the ground waves. In Fig. 4 it is seen that the air waves 32 are propagated directly from the exciter antenna 5 to the receiver loop 20, but that the ground waves 33 arrive at the said loop after being refracted downward from the ground surface 27 to the reflecting surface 34, which may be the top of the salt-water stratum 30 (Fig. 1), where they are returned to the surface 27 and again refracted to the loop 20. It is to be understood that the angle of incidence and of reflection are equal at the surface 34, and that the refraction at the ground surface 27 follows the law governing "grazing incidence," so that the angles $i'$ of the refracted ray correspond to the "critical angle."

The condition for the optimum detection of the refracted ray is that the length of the earth path shall be a minimum, to reduce as far as possible the absorption, and that there shall be either $m$ or $(m+\frac{1}{2})$ more waves along the path via $o$ than in path $a$, $m$ being an integer.

For grazing incidence Snell's law becomes:

$$n = \frac{\sin i}{\sin i'} = \frac{1}{\sin i'}$$

$n$ being the index of refraction of the medium overlying the reflecting surface 34. Also $$n = \frac{\lambda a}{\lambda g}$$

where $\lambda a$ is the wave length in air and $\lambda g$ is the wave length in the ground. Then $$\frac{a}{\lambda a}$$

is the number of waves in the air path $a$ and $$\frac{2d}{\lambda g \cos i'} = \frac{2nd}{\lambda a \cos i'}$$

is the number of waves in the earth path via $o$. Consequently we may write $$\frac{2nd}{\lambda a \cos i'} - \frac{a}{\lambda a} = m + \tfrac{1}{2}$$

but $a = 2d \tan i'$, so that $$m + \tfrac{1}{2} = \frac{2d}{\lambda a}\left(\frac{n}{\cos i'} - \tan i'\right)$$

Since $$\sin i' = \frac{1}{n}$$

$$\cos i' = \sqrt{1 - \frac{1}{n^2}} = \frac{1}{n}\sqrt{n^2 - 1}$$

$$\tan i' = \frac{1}{\sqrt{n^2 - 1}}$$

and $$\lambda a = \frac{c}{f}$$

where $c$ is the velocity of an electromagnetic wave in free space and $f$ is the frequency of the wave in cycles per second, we have $$m + \tfrac{1}{2} = \frac{2fd}{c}\left(\frac{n^2}{\sqrt{n^2 - 1}} - \frac{1}{\sqrt{n^2 - 1}}\right)$$

$$= \frac{2fd}{c}\sqrt{n^2 - 1}$$

Assigning $c$ its numerical value of $9.84 \times 10^8$ feet per second, and letting D be the depth of the reflector in thousands of feet and F be the frequency in megacycles ($10^6$ cycles per second), we can write $$m + \tfrac{1}{2} = \frac{2\sqrt{n^2 - 1}\,(D \times 1000)(F \times 10^6)}{8.84 \times 10^8}$$

$$= 2.034 DF\sqrt{n^2 - 1} \qquad (3)$$

The path of but a single ground ray has been considered in the foregoing derivation and in the diagram of Fig. 4, but it is to be understood that the rays continue to "peel off" and enter the earth at grazing incidence as the air wave advances from the radiator 5 toward the receiver loop 20, and similarly, the distance $a$ from their point of penetration, the rays continue to emerge from the earth at the critical angle, and are refracted along the earth's surface and concentrated as a bundle of rays at the said receiver loop. For a given frequency, all of the emergent ground rays have the same phase at any particular point along the earth's surface, and also at any point on the said surface to the right of $h$ (Fig. 4) the relative phase of the air rays and the ground rays will be the same. This action leads to a distinct reinforcement of the waves that reach the said loop.

It will be noticed that the separation, or spread S, between the exciter and receiver does not appear in Equation 3. It is to be recognized, however, that the spread must be sufficient to permit detection of the refracted ray, and that it should be kept reasonably low to minimize attenuation.

Referring again to Fig. 1, if the frequency of the waves generated by the exciter 1 be varied in successive steps, and field-intensity measurements obtained at each step with the receiver 18, then a graph can be plotted which displays the relation between frequency and field intensity for the particular setup. Interference maxima and minima will appear on the frequency-field intensity curve when the path of the refracted ray and the path of the air ray differ in length by the proper amount to give constructive or destructive interference, respectively. Ignoring phase changes that may occur at the reflector, the incremental frequency (frequency difference between successive maxima or minima) needed to cause destructive interference (minima) can be found by subtracting Equation 3 from Equation 4 below:

$$2.034DF_2\sqrt{n^2-1}=m+1\tfrac{1}{2} \qquad (4)$$

$$2.034DF_1\sqrt{n^2-1}=m+\tfrac{1}{2} \qquad (3)$$

which results in $$2.034D(F_2-F_1)\sqrt{n^2-1}=1$$

or $$d=\frac{492}{(F_2-F_1)\sqrt{n^2-1}} \qquad (5)$$

when the depth $d$ is expressed in feet, the incremental frequency $(F_2-F_1)$ in megacycles, and $n$ is the index of refraction of the geologic material overlying the reflector.

It is important to note from Equation 5 that no account need be taken of the spread S (Fig. 4), provided it is sufficient to give the required working depth, as the angle of penetration and emergence of the waves is determined by the index of refraction of the medium investigated, and not by the geometry of the system, as in the case of seismic reflections, and as previously assumed for many of the electromagnetic methods. Neither the literature nor the art of electrical prospecting has ever described or inferred the wave path postulated in developing Equation 5, and the important fact that the spread between the exciter and receiver need not be known for the operation of the present invention provides a distinguishing characteristic and a fundamental difference between the said invention and the earlier techniques utilizing electromagnetic-wave propagation.

The derivation of Equation 5 is based on some simplifying assumptions. The earth's surface 27 and the underground reflector 34 are considered plane parallel surfaces; the velocity of the air wave near the ground is taken the same as in free space (wave-length measurements indicate that this assumption is permissible), and the refractive index is considered independent of frequency.

When the reflector makes an angle $\theta$ with the earth's surface, its depth is given by:

$$d=\frac{984(\sqrt{n^2-1}\cos 2\theta+\sin 2\theta)}{(F_2-F_1)[n^2(\cos 2\theta+1)-2\cos 2\theta+2\sqrt{n^2-1}\sin 2\theta]} \qquad (6)$$

where $\theta$ is positive if the slope of the reflector is downward from the receiver to the exciter, and negative (or $\pi-\theta$) if the slope is downward to the receiver. In deriving Equation 6, which reduces to Equation 5 when $\theta$ is zero, it was assumed for simplicity that the line joining the exciter and receiver is perpendicular to the strike of the reflector. In the more general case, where the line joining the exciter and receiver is oblique to the strike of the reflector, three dimensions must be considered because the plane of incidence that contains the exciter and receiver is not vertical. The general case will not be treated here.

Figure 5:
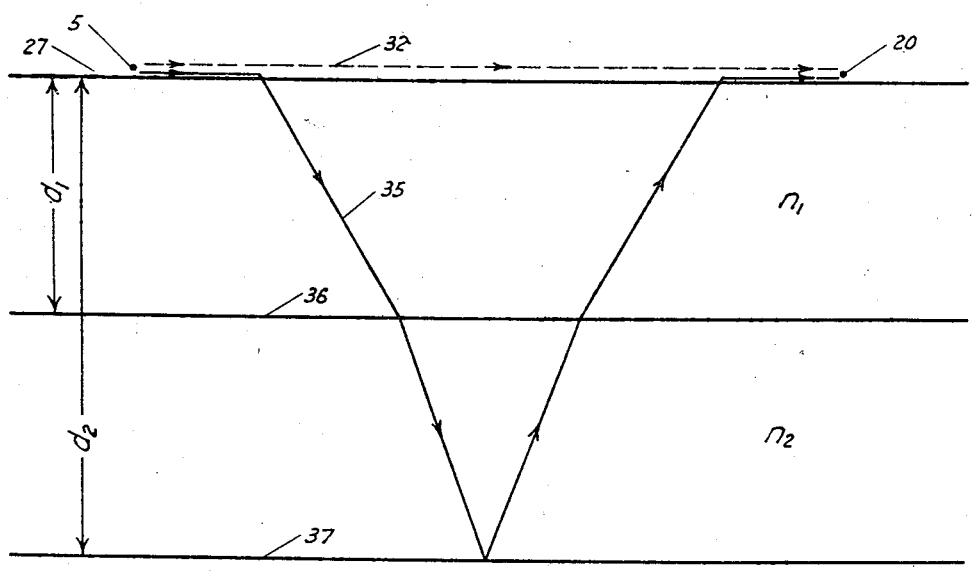
Fig. 5 illustrates the arrangement of the exciter and receiver when used to find the depth of the lower of two subsurface reflectors, together with the ray paths for the air and ground waves, and the notations used in describing the operation of the invention.

In Fig. 5 appears a diagram illustrating the path followed by the ground wave 35 in traversing two earth layers having refractive indices $n_1$ and $n_2$, when $n_2>n_1$. If the reflecting surfaces are denoted by 36 and 37, then the depth of the lower reflector may be obtained from the following expression:

$$d_2=d_1+\frac{492}{\sqrt{n_2^2-1}}\left[\frac{1}{F_2-F_1}-\frac{1}{F_4-F_3}\right] \qquad (7)$$

where $(F_4-F_3)$ is the incremental frequency corresponding to the lower reflector. And for any number of reflectors $r$, the depth of the $r$th reflector will be:

$$d_r=d_{r-1}+\frac{492}{\sqrt{n_r^2-1}}\left[\frac{1}{F_{2r}-F_{2r-1}}-\frac{1}{F_{2r-2}-F_{2r-3}}\right] \qquad (8)$$

The solution of the problem involving multiple reflectors, having various dips, seems unwarranted here.

For the simple case of a plane reflector parallel to the earth's surface (Fig. 4), the ground waves enter and emerge from the earth at grazing incidence, and after progressive reinforcement finally arrive at the receiver loop 20. It is to be understood, however, that the reinforcing action of the reflected rays does not occur when the dip of the reflector is positive, since only the reflected rays that emerge at the receiver loop will be detected. When $\theta$ has an appreciable negative value, the reflected rays can not emerge at the ground surface 27 because they are incident on the surface at an angle greater than the critical angle, and hence are totally reflected downward and therefore do not reach the receiver loop. In case a negative dip of the reflector is suspected, because of the absence of reflections, it is easily possible to check the condition by transposing the exciter and receiver.

In developing the theory underlying the operation of the herein described invention, the preceding discussion has been predicated on the assumption that the electromagnetic waves propagated by the exciter antenna are incident on the earth's surface at an angle of 90 degrees. It is by no means to be inferred, however, that the invention will not function unless the waves are incident on the said surface at an angle of 90 degrees, for it is known that various angles of incidence can be used successfully in practicing the invention. In fact, angles other than 90 degrees are preferable in some instances, for example, in certain cases involving dipping reflectors. The operation of the invention for various angles of incidence is susceptible to the same kind of mathematical treatment as already outlined for the condition of 90-degree (grazing) incidence, though in general, grazing incidence leads to simpler solutions. This will be seen by comparing Equation 5, which was derived for grazing incidence, with the equation given below for various angles of incidence $i$, other conditions remaining the same.

$$d = \frac{492\sqrt{n^2 - \sin^2 i}}{(F_2 - F_1)(n^2 - \sin i)}$$

The preferred apparatus and methods are based on grazing incidence largely because of the resulting simplification in the exciter radiating system, and the reinforcement of the waves that generally occurs at the receiver loop when the propagated waves peel off and enter the earth at grazing incidence. In short, the preferred means and methods are simpler to apply in practice, are more convenient to use, and in general are more effective.

The operation of the present invention can be expressed mathematically for any angle of incidence of the waves impinging on the earth's surface, for complex arrangements of earth layers and reflecting surfaces, and for variations of the refractive indices with depth and angle of incidence of the waves employed, but the cases already described are considered sufficient to explain the fundamental theory underlying the operation of the invention, to demonstrate its application to particular subsurface problems, and to indicate its scope of usefulness.

Having referred briefly to the operating principle of the invention, it remains now to consider its application to achieve the objects already enumerated.

Consider first the application of the invention to determine the depth of a subsurface zone (or mass) which reflects electromagnetic waves, for example, a salt-water stratum. For simplicity in the following discussion we shall assume that both the ground surface and the underlying reflector are plane parallel surfaces. The apparatus is set up as indicated in Fig. 1, with the midpoint between the exciter antenna 5 and the receiver loop 20 in the immediate vicinity of the point on the ground surface 27 at which the depth determination is to be made. Knowing the maximum depth to be explored, the minimum permissible spread $a$ (Fig. 4) may be found from Fig. 6, which shows the relation between $a$ and $d$ for three values of the refractive index. As stated previously, the spread is not critical and its value need not be known. The only limitation for the spread is that it be a sufficient amount to permit detection of the ground waves returned to the receiver by the buried reflector, and that it be small enough to minimize the attenuation of the air and ground waves.

After the apparatus is positioned, the exciter 1 is energized and its power level adjusted and maintained at a suitable and constant value by means of the variable auto-transformer V and indicating current meter $M_1$ or $M_2$ (Fig. 2). The frequency of the electromagnetic wages propagated by the antenna 5 then is varied in successive steps through the required frequency range, and at each step a selected parameter of the field associated with the waves at the loop 20 is measured with the receiver 18, and recorded. It is understood that the frequency increment to be used, and the frequency range to be explored, are determined by the depth of the reflector, it being desirable to decrease the frequency increment and range as the depth of the reflector increases, and vice versa. Significant information is derived by measuring one or more of several field parameters at the said loop as the frequency of the radiations is varied, but as pointed out previously, in the preferred form of operation the vertical component of the electric field, or what is conventionally termed the "field intensity," is measured by the said receiver.

Remembering that it is the purpose of the series of observations to determine the depth of a subsurface reflector by means of interference phenomena on the frequency-receiver reading curve, it is therefore evident that no maximum and/or minimum should appear on the curve that is due to instrumental characteristics. The exciter and receiver described previously are free of such effects, but great care must be exercised in the design and operation of the exciter radiating system to completely avoid undesirable frequency characteristics. And moreover, to display with clear definition the recurrent maxima and minima associated with a particular underground reflector, it frequently is desirable that there be no progressive increase or decrease in the intensity of the air waves at the receiver loop as the frequency of the propagated waves is varied through the working range, for a steep slope of the frequency-receiver reading curve tends to obscure the "reflections" caused by the said reflector.

The solution of this problem can be approached in numerous ways, each of which finally results in an engineering compromise that is dictated by the required mobility of the apparatus. There follows a description of the preferred radiator and mode of operation for maintaining substantially constant the field intensity due to the air waves at the said receiver loop. The mechanism and operating technique to be described result in a substantially constant radiation pattern, or field pattern, about the exciter antenna as the frequency of the propagated waves is varied.

The preferred radiating system consists of the single-wire sloping antenna 5 illustrated in Fig. 1, which is grounded by the metallic rod 16. To prevent undesirable frequency characteristics, it is preferable that substantially the same current distribution be maintained in the antenna for each frequency required in practice. This is accomplished by making the length of the said antenna, from the insulator 10 to the ground connection 16, approximately equal to one-quarter wave for each frequency used, which requires that the antenna length be reduced as the frequency is increased. The length of the antenna can be adjusted readily by means of the wire reel 12 and rope reel 13, each of which is provided with a crank and ratchet for maintaining the said antenna at the proper tension for all frequency settings. In determining the antenna length corresponding to a particular frequency, it is only necessary to find the length (approximating one-quarter wave) that results in maximum radiation current, for a given input to the exciter, when the reactance of the antenna coupling unit is substantially zero. When the proper antenna lengths have been found experimentally for the respective frequencies to be employed in practicing the invention, the antenna is marked for each frequency, so that the correct length for any desired frequency can be obtained quickly and conveniently.

The antenna lengths arrived at in one area will differ sometimes from those found in another area, owing to changes that take place in the electrical properties of the ground material, but experience shows that the order of difference is comparatively small and that satisfactory operation is secured with a fixed schedule of antenna lengths for all ordinary areas.

The foregoing description has dealt with the preferred form of "grounded" antenna, but it should be stated here that the wire 17 can be connected to a suitable counterpoise instead of the ground rod 16, and that the procedure outlined for finding the proper antenna lengths will apply equally well in either case.

It should be brought out at this point that when the measurements require frequencies so low that it is impracticable to use an antenna having a physical length approximating one-quarter wave, then by utilizing a "top loaded" antenna it is possible to maintain essentially constant current distribution in the radiating system by so varying the antenna length and the loading inductance that the electrical length of the antenna is kept substantially one-quarter wave for each frequency employed.

It is to be undertood also that an antenna length other than that approximating one-quarter wave can be used successfully, and that radiating systems different from the one illustrated in Fig. 1 will be found suitable for practicing the invention. For example, the "rhombic" antenna is aperiodic over a considerable frequency range, and would be found suitable in many instances. It is desirable to emphasize, therefore, that the antenna described herein is not the only type of radiator than can be used successfully in practicing the invention, but it is the preferred form because of its simplicity, general utility and portability.

If a given current were to flow in a quarter-wave antenna of fixed height, the field intensity at the receiver loop 20 usually would increase as the frequency of the current increased unless some means were adapted to compensate for the change. There are several ways to accomplish the desired result, but the preferred means is to decrease the effective height of the antenna 5 as the frequency is increased. The intensity of the radiation emitted by an antenna operating under free-space conditions varies directly with the effective height of the said antenna, but with the preferred type of antenna described herein, which is placed comparatively close to the earth, the variation of intensity with effective height is not very large, and accordingly, it is found that the effective height of the inclined antenna illustrated in Fig. 1 can be varied automatically in substantially the correct amount for each frequency setting employed by properly proportioning the height of poles 8 and/or 9. Satisfactory operation has been obtained, when using moderate spreads and working over comparatively flat and open terrain, by making the height of pole 8 about 7 feet and pole 9 some 20 feet, though it is to be understood that the height of each pole can be varied to advantage at times.

For operations involving relatively long spreads, there is a tendency in some areas for the air-wave field intensity at the receiver loop to decline with increasing frequency, due to terrain conditions and the effect of a larger attenuation term (which includes S) in the transmission equation. When working in areas characterized by abnormally high absorption, the decline in the receiver reading at the higher frequencies can be easily overcome by altering the height of poles 8 and/or 9. It has been found advantageous at times to use a quarter-wave inverted L antenna, whose flat top remains at the same height throughout the frequency measurements. Other alternatives, which give greater compensation at relatively distant points for the decrease in air-wave field intensity with increasing frequency, are to raise the height of the L antenna as the frequency is raised, or to increase the radiation current by predetermined amounts as the frequency is increased.

It is well to state here that the behavior of the radiating system can be studied and checked by means of a control receiver 18' located in the near neighborhood of the radiator, but far enough removed to lie well outside its induction field. By maintaining the required parameter or parameters constant at the said control receiver, it is possible to keep the radiation the same throughout the series of frequency measurements for any type of antenna system by altering its height and/or the current flowing therein. And alternatively, if the radiation were allowed to vary as the frequency of the emitted waves varied, whether progressively or anomalously, the change in the said radiation could be tolerated and compensated for by a comparison of the frequency-reading curve of the control receiver and that of the remote receiver employed in the regular field operations.

The preceding discussion has disclosed a preferred means and method for maintaining substantially constant field intensity for the air waves at the receiver loop 20, and it has been pointed out that alternative apparatus and operating techniques can be used successfully in practicing the herein invention. It should not be inferred from what has gone before that the invention is inoperative unless the said field intensity remains substantially constant, for experience demonstrates that workable results can be obtained without observing the precautions required to maintain the said field intensity essentially the same. It is known, however, that superior results are obtained with the preferred means and method described.

After the required frequency band has been explored, using the precautions mentioned to maintain substantially uniform field intensity for the air waves at the receiver loop 20, then a graph may be plotted which displays the relation between frequency and resultant field intensity at the said loop due to the combined air waves and ground waves. Quite obviously, the operation of the receiver 18 could be made automatic and its readings recorded on a photographic film, but the attendant complications appear unwarranted. When an underground reflector is present, such as the salt-water stratum 30 in Fig. 1, then the frequency-field intensity curve will display the interference phenomena which must take place at the said loop between the air waves and the ground waves which are returned to the surface by the underground reflector.

Reference will be made here to some practical examples to illustrate the interference phenomena under discussion, and to demonstrate the application of the present invention to the problem of determining the depth of a subsurface reflector. In Fig. 8 appears a frequency-field intensity curve obtained in the immediate vicinity of a well located in northwest Caddo Parish, Louisiana. The axes are shown broken away from the point of intersection in order to utilize the desired portion of the curve for illustration at a suitable scale. A Schlumberger log of the well showed three water-filled strata: the Wilcox sand, exposed at the surface and extending to a depth of 675 feet; the Nacatoch sand, from 1,440 to 1,705 feet, and the Blossom sand lying at a depth of 2,450–2,525 feet. The best defined recurrent maxima and minima displayed by the curve represent "reflections" from the Nacatoch sand. In arriving at the incremental frequency corresponding to the Nacatoch reflections, the average frequency difference can be found from either the successive maxima or the successive minima, or by averaging the values shown by the said maxima and minima. Only the most prominent maxima correlating with the Nacatoch sand will be used in this instance, and in Fig. 8 is indicated the incremental frequency ($x$) thus determined.

The frequency-field intensity curve shown in Fig. 9 was obtained in the same general area as that of Fig. 8, but where the depths of the same three strata were: Wilcox sand 0–385 feet; Nacatoch sand 1,176–1,415 feet, and Blossom sand 2,130–2,195 feet. Here again is indicated the incremental frequency ($x'$) that correlates with the most pronounced maxima identified with the Nacatoch reflections. The axes are shown broken away from the point of intersection in order to utilize the desired portion of the curve for illustration at a suitable scale. It is noted that for Fig. 9 the incremental frequency is 0.185 mc., which is somewhat larger than the average value of 0.146 mc. disclosed by the previous example. This is in strict conformity with the equations derived previously, which show that the incremental frequency increases with decreasing depth of the reflector.

The geologic sections investigated by the curves of Figs. 8 and 9 are analogous to the two-layer case illustrated in Figs. 5, where the upper layer is represented by the Wilcox sand, and the lower layer by a predominantly shale section which separates the Wilcox and Nacatoch sands. It is known from previous experience in the area under discussion that the refractive index for the Wilcox sand is 2.78 and for the shale section is 2.32. Substituting these values in Equations 5 and 7 respectively, and ignoring the inconsequential dip of the reflector, it is found that an incremental frequency of 0.146 mc. (Fig. 8) gives a depth for the Nacatoch sand of 1,448 feet, which checks the actual dept within 0.55 per cent, and that an incremental frequency of 0.185 mc. (Fig. 9) results in a calculated depth of 1,179 feet, which differs but 0.26 per cent from the actual depth.

A spread of 3,700 feet was used in obtaining the curves appearing in Figs. 8 and 9. In the same general area, however, excellent precision was obtained in checking with Nacatoch sand at a depth of 350 feet with a spread of 7,000 feet, thus confirming the fact that the spread does not enter directly into the determination of reflector depths with the herein invention.

To determine the depth of a subsurface reflector from a frequency-field intensity curve, it is necessary, of course, to know within reasonable limits the effective value of the refractive index ($n$) for the geologic section explored. If $n$ is not known for the area under examination, and can not be estimated with sufficient accuracy, then it is the customary procedure in practicing this this invention to make a depth determination at a point in the general area being investigated where the depth and approximate dip of the required reflector is known from drilling, and thereby solve for $n$ in Equation 6 by substituting the known depth and dip of the reflector and the observed incremental frequency. If more than one reflector is involved, and geologic conditions will not permit the use of an average value of $n$ for the entire stratigraphic section overlying the reflector being investigated, then Equation 8 can be used to determine $n$ for each overlying layer, the investigation being commenced preferably with the uppermost layer, and extended downward a layer at a time by progressively increasing the spread between the exciter and receiver. With this technique no difficulty can be encountered from reflections arising from reflectors deeper than the particular layer whose $n$ is required. It is to be understood, however, that oftentimes the reflections evidenced by a single frequency-field intensity curve will make possible the unambiguous determination of the refractive indices corresponding to the respective layers separating a considerable number of reflectors. The procedure outlined here is much the same as that followed in seismic prospecting, when velocity determinations are made at a well that furnishes the depths of significant reflectors, and the velocity values thus found are subsequently utilized in the same general area in making depth determinations involving the same or adjacent reflectors.

It should be recognized that interference maxima and minima will appear on a frequency-field intensity curve for each suitable reflecting surface whose depth does not exceed the maximum working depth fixed by the spread employed. For example, the curves of Figs. 8 and 9 display reflections from the base of the Wilcox sand and the top of the Blossom sand, in addition to the designated reflections from the top of the Nacatoch sand. It frequently occurs that both the top and base of the same zone can be identified from the curve, provided the thickness of the said zone is satisfactory and other conditions are satisfied. In all cases the reflectivity of a boundary separating two partially conducting media is governed, among other things, by the relative indices of refraction, it being remembered that for a partial conductor the index of refraction is determined to some extent by the angle of incidence of the waves on the said partial conductor, but principally by its conductivity, dielectric constant, magnetic permeability, and the frequency of the waves. Haas (loc. cit.) has developed an expression from Maxwell's equations for the complex refractive index of a partial conductor traversed by a plane wave. He shows that the imaginary part of the expression represents the absorption factor (Eq. 2), and the real part is given by:

$$n = \sqrt{\frac{\mu}{2}\left(\sqrt{\epsilon^2 + \frac{4\sigma^2}{f^2}} + \epsilon\right)}$$

where the notations are the same as for Equation 2. It can also be shown that the reflecting power of certain materials varies in an anomalous manner with frequency, and that at a discrete frequency band or bands the material exhibits exceptionally high reflectivity, in somewhat the same manner that various media show selective absorption characteristics. A complete discussion of reflection phenomena will be found in "High-Frequency Alternating Currents," McIlwain and Brainerd, pp. 408–438, 1939, John Wiley & Sons, Inc., New York, and in "Electrodynamics," Page and Adams, pp. 408–419, 1940, D. Van Nostrand Co., Inc., New York.

In the practical use of the present invention to find the depth of underground reflectors, recourse often is had to curves similar to those appearing in Fig. 7, which show the relation between incremental frequency and depth for several values of the refractive index. It is advantageous at times to prepare a curve of this kind for each area under investigation, based on the value of $n$ which is estimated from experience or accurately determined, and the depth of a given reflector can be read from the curve by knowing the respective incremental frequency. The procedure may be applied to any reflector whose depth does not exceed the effective working depth, but in so doing it should be understood that it is particularly adapted to reconnaissance surveys not requiring much precision, for incremental frequency-depth curves ordinarily are based on the assumption that the dips of the reflectors are not large enough to alter appreciably the shape of the curves, and that the average refractive index of the material overlying the reflector being mapped remains essentially constant throughout the area surveyed.

In applying the herein described invention to determine the depth and structure of subsurface reflectors, an important advantage results from the fact that the maximum working depth can be easily controlled by the spread between the exciter and receiver, and hence an area can be mapped at progressively greater depths by correspondingly increased spreads. It is evident from this that any suitable reflector can be investigated without the sometimes confusing effect occasioned by deeper reflectors.

The results obtained in making depth determinations with the herein disclosed invention in a number of different geologic provinces demonstrate that the actual depths of various reflectors can be checked with an order of error not exceeding about one per cent, and that the invention has wide application and usefulness in mapping the structure of important stratigraphic formations in unknown areas.

Before ending the discussion dealing with the application of the invention to the problem of finding the depth of subsurface zones which reflect electromagnetic waves, it is desired to point out that the said invention furnishes an effective technique for determining the depth and configuration of the bedrock which ordinarily underlies placer deposits. The pronounced electrical contrast between the bedrock and overlying gravels offers an excellent reflector for electromagnetic waves, and the depth and topography of the bedrock surface can be found quickly and conveniently with the comparatively short spreads usually required in practice. It is quite evident that the same procedure can be used in mapping the bedrock in other than placer areas, and in other than mining problems, for instance, in a considerable number of construction problems, where it is of great importance to know the depth and topography of the bedrock in order properly to design the foundations of dams, bridges and other structures.

Summarizing, the preceding discussion has pointed out certain inherent and fundamental fallacies identified with many of the earlier electromagnetic methods utilizing wave transmission; has dealt with the principle of operation of the present invention; has described apparatus and methods for propagating electromagnetic waves through partially conducting strata, and for detecting the waves on their return to the earth's surface after their reflection by underground masses having anomalous indices of refraction; the discussion has presented a useful and convenient method of finding the depth of buried reflectors, and has brought out notable advantages of the invention over previous techniques. It remains now to consider other important applications of the invention.

The next application to be discussed is that of locating and defining underground masses, other than geologic strata, which reflect electromagnetic waves. This category includes a number of significant applications, among which may be mentioned the problem of determining the presence, depth and extent of mineralized areas in mining geology. It is known that many minerals of economic importance are characterized by anomalous electrical properties which make their detection and definition by wave reflection a relatively simple matter. This is true for both lode and placer deposits. In the case of lode deposits, the metallic minerals as well as sulphide ores present sharp electrical contrasts with the country rock ordinarily encountered in practice, and for placer deposits, the presence of gold or other conducting minerals so increases the dielectric constant (and consequently the refractive index) of the enclosing earth volume that the mineralized area can be easily detected, defined and partially appraised by its increased reflecting power for electromagnetic waves. The presence of a mineralized area of the character mentioned is indicated by the appearance of maxima and minima on a frequency-field intensity curve obtained over the electrically anomalous area. By making a number of frequency runs at various locations in an area under examination, it is possible to determine the lateral extent and depth of the deposit at significant points. If the deposit were of sufficient thickness, its top and bottom limits could also be found.

A somewhat analogous problem is that of finding electrical discontinuities in buried strata, such as occur in a porous stratum at the boundary between salt water and petroleum, or when a reflecting zone "wedges out." From what has gone before it is quite obvious that a frequency-field intensity curve will evidence the "wedging out" of a reflecting zone by the disappearance of the characteristic maxima and minima associated with the said zone. And in a similar way the definite electrical contrast at the contact between buried accumulations of salt water and petroleum, whose conductivities and dielectric constants differ enormously, must necessarily cause significant indications on frequency-field intensity curves obtained above and adjacent to the said contact.

A fault represents a discontinuity in geologic strata, with the formations on one side of the fault vertically displaced with respect to the similar formations on the other side of the fault. It is quite clear that any vertical displacement of a reflecting zone will be apparent from depth determinations made on each side of the zone of faulting, and therefore frequency-field intensity curves obtained along a profile which intersects the strike of a fault must disclose the difference in elevation of the reflectors at a fault plane. Moreover, the "throw" of the fault, at various depths, will be evident from the difference in elevation of the reflectors in the near vicinity of the zone of faulting.

Salt domes and igneous plugs, as well as numerous other discrete geologic masses, may be found and defined with this invention because of the difference in their reflection coefficients and those of the surrounding media. Upthrust masses that have been intruded through reflecting beds are detected with particular ease. The same is true for mineralized veins, many of which offer excellent reflecting surfaces for electromagnetic waves. The reflecting power of such a vein is determined largely by the degree of mineralization, and hence the invention makes it possible to secure an approximate idea of the amount of mineralization present in the vein.

We come now to a consideration of one of the most important applications of the invention, namely, the determination of the optimum frequency to be employed in conducting electromagnetic-wave investigations. The invention is well adapted to the solution of this problem, and the results derived therefrom furnish criteria for guiding the application of all electromagnetic methods utilizing wave propagation through absorbing media.

It has already been shown that the conventional belief is erroneous in supposing that the attenuation suffered by an electromagnetic wave in traversing partially conducting media must increase exponentially with the frequency of the wave, for the reason that the effective electrical properties, which determine the attenuation loss, vary in an anomalous manner with frequency. In other words, geologic media exhibit selective-frequency absorption. The problem resolves itself therefore into providing means and methods for finding the particular frequency band, or one comparable thereto, that makes the transparency a maximum for the geologic section under investigation.

When the optimum frequency is to be found for a particular geologic section at a given location, the preferred method is to set up at the said location the exciter 1 and receiver 18 with the proper spread to explore to the required depth, and then obtain a frequency-field intensity curve. Using an adequate range for the frequency measurements, it will be found that the maxima and minima associated with a particular subsurface reflector will vary in amplitude as the frequency of transmission is varied. Since the maximum amplitude will occur when the frequency has its optimum value, it follows that the optimum frequency will lie at or between the conjugate maximum and/or minimum having the largest amplitude. This is clearly displayed by the curve of Fig. 8, which shows that the recurrent maxima and minima near the middle of the frequency range explored have much greater amplitude than those appearing at higher or lower frequencies, and that for a depth of 1,440 feet the most effective frequency for the range covered lies substantially between the maximum and minimum denoted $t$ and $u$ respectively.

Although the curve of Fig. 8 shows that the most effective frequency for the range investigated falls substantially within the interval $tu$, it exhibits the further fact that the optimum frequency probably would be lower than any used in the series of measurements. It is evident, of course, that to determine the optimum frequency in a given case it is necessary to find the maximum and/or minimum having the largest amplitude than can be obtained by exploring the entire usable portion of the electric spectrum. Experience demonstrates, however, that it is unnecessary in practice actually to determine the single frequency, or narrow frequency band, that passes the greatest amount of energy through the section. To conserve time in the field operation of the invention, and to simplify the design and construction of the exciter and receiver, only a sufficient range is explored to disclose a frequency band that will pass enough energy to satisfy the requirements of the problem at hand. Once the frequency characteristics of various geologic provinces are catalogued, the optimum frequency band, or one of comparable effectiveness, can be found by investigating a relatively small frequency range. Satisfactory results have been obtained in practice by exploring a frequency range whose lower limit did not extend below 100 kc. and whose upper limit did not exceed 5 mc.

The converse problem of determining for a particular stratigraphic section the frequency band at which the absorption of energy is greatest, or the bands at which absorption increases, is solved by finding the frequency or frequencies which reduce the amplitude of the maxima and minima associated with a reflector lying near the required depth of investigation.

In using frequency-field intensity curves for the purpose of determining the frequency characteristics of the media involved, it is to be remembered that large amplitude variations are due at times to the synchronized influence of two or more reflectors, and hence in finding the optimum frequency or absorption bands by means of the relative amplitudes of successive maxima and/or minima, the said amplitudes must be related only to a discrete reflector, and not to the combined effect of two or more reflectors. Also, selective reflection as well as selective absorption must be considered. This is a fortunate circumstance, for selective reflection phenomena sometimes will provide a means for identifying certain strata and minerals whose reflectivities so vary with frequency that their presence is disclosed by wave reflection.

It will be evident from what has gone before that low attenuation of the waves, and/or high reflectivity of the surface bounding a buried mass characterized by selective reflection, can lead to the relatively large amplitudes of the maximum and/or minimum that is used in finding the optimum frequency. This composition of effects introduces no difficulty, however, for regardless of the cause, the frequency so found is the optimum frequency to employ in mapping the said surface. The attenuation and selective-reflection effects can be separated by a comparison of optimum-frequency determinations carried out with reflectors above and/or below the said boundary. Obviously, the same procedure can be used in the analysis of absorption bands disclosed by frequency-field intensity curves.

For the sake of simplicity, the foregoing discussion has concerned only the preferred forms of apparatus, and the preferred modes of operation, whereby the measurements involve only the vertical component of the electromagnetic field present at the receiver loop 20. It is to be emphasized, however, that alternative apparatus may be employed, and that alternative methods of operation are possible, and that these alternative methods may, by utilizing the universal mounting provided for the said loop, be predicated on the variations with frequency of any significant parameter or parameters of the said electromagnetic field.

It is to be understood that the apparatus and methods disclosed herein are susceptible of various modifications without departing from the spirit or broad principles of the invention, and accordingly it is desired to claim all novelty inherent in the invention as broadly as the prior art permits.

What is claimed as new and useful is:

1. In a method of conducting electromagnetic-wave investigations, the steps of: generating electromagnetic waves with a wave-generating means, propagating said waves with a radiator positioned above and adjacent to the earth's surface and electrically coupled to said wave-generating means, receiving said waves with a receiver located in or above the air-earth interface and spaced apart from said radiator, maintaining at a predetermined value the amplification constant of said receiver, varying the frequency of the waves emitted by said wave-generating means, measuring the magnitude of the output of said receiver, and simultaneously varying the length and effective height of said radiator in a manner adapted to maintaining substantially constant at said receiver the amplitude of the waves arriving through the air from said radiator.

2. In a method of conducting electromagnetic-wave investigations, the steps of: generating electromagnetic waves with a wave-generating means, propagating said waves with a radiator electrically coupled to said wave-generating means in such a way as to transmit an air-wave component wholly through air and a ground-wave component in part through the ground, receiving both said air-wave and ground-wave components with a distant receiver spaced apart from said radiator and receiving said air-wave component with a nearby receiver located adjacent to said radiator to afford an output indicative of variations in amplitude of the transmitter output, maintaining at a predetermined value the amplification constants of said distant receiver and said nearby receiver, varying the frequency of the waves emitted by said wave-generating means, measuring the magnitudes of the outputs of said distant receiver and said nearby receiver, compensating for each said frequency the output of said distant receiver for corresponding output variations of said nearby receiver, whereby for each said frequency the output of said distant receiver is compensated for variations in amplitude of the transmitter output, and determining the relation between the compensated output of said distant receiver and the frequency at which said compensated output is measured as the frequency is varied.

3. In a method of conducting electromagnetic-wave investigations, the steps of: generating electromagnetic waves with a wave-generating means, propagating said waves with a radiator electrically coupled to said wave-generating means in such a way as to transmit an air-wave component wholly through air and a ground-wave component in part through the ground, receiving both said air-wave and ground-wave components with a distant receiver spaced apart from said radiator and receiving said air-wave component with a nearby receiver located adjacent to said radiator to afford an output indicative of variations in amplitude of the transmitter output, maintaining at a predetermined value the amplification constants of said distant receiver and said nearby receiver, varying the frequency of the waves emitted by said wave-generating means, measuring the magnitudes of the outputs of said distant receiver and said nearby receiver, maintaining the output of said nearby receiver substantially constant by varying the amplitude of the waves emitted by said wave-generating means, and determining the relation between the output of said distant receiver and the frequency at which said output is measured as the frequency is varied.

4. In a system for conducting electromagnetic-wave investigations, apparatus comprising an oscillator-amplifier combination for generating electromagnetic waves, means for varying the frequency of the waves generated by said oscillator-amplifier combination, means for standardizing the frequency calibration of said oscillator-amplifier combination, means for maintaining substantially constant the amplitude of said waves, a radiator of said waves electrically coupled to said oscillator-amplifier combination, and means for simultaneously varying the length and effective height of said radiator in accordance with the lengths of the waves radiated therefrom, said last mentioned means including reels mounted adjacent to each other and arranged to maintain the combined unreeled lengths of said radiator and a tensional member connected thereto substantially constant, whereby the radiation pattern of said radiator may be maintained substantially constant at different frequencies, said oscillator-amplifier combination being combined with a receiver of electromagnetic waves, a suitable amplifier for increasing the amplitude of incoming waves, means for determining the magnitude of the output of said amplifier, means for maintaining at a predetermined value the amplification constant of said receiver and said amplifier, an antenna for energizing said receiver, and means for selecting the whole or various fractional parts of the antenna current to be transferred to said receiver.

WILLIAM M. BARRET.

REFERENCES CITED

The following references are of record in the file of this patent:

UNITED STATES PATENTS

| Number | Name | Date |
| --- | --- | --- |
| 1,438,290 | Beakes | Dec. 12, 1922 |
| 1,718,352 | Guilford | June 25, 1929 |
| 1,838,371 | Deardorff | Dec. 29, 1931 |
| 1,860,128 | Bethenod | May 24, 1932 |
| 2,036,456 | Buschbeck | Apr. 7, 1936 |
| 2,105,247 | Jakosky | Jan. 11, 1938 |
| 2,106,713 | Bowers | Feb. 1, 1938 |
| 2,138,460 | Potapenko | Dec. 6, 1938 |
| 2,172,688 | Barret | Sept. 12, 1939 |
| 2,212,338 | Bown | Aug. 20, 1940 |
| 2,309,481 | Summerhayes | Jan. 26, 1943 |
| 2,407,267 | Ginzton | Sept. 10, 1946 |
| 2,424,598 | Willoughby | July 29, 1947 |
| 2,426,918 | Barret | Sept. 2, 1947 |

OTHER REFERENCES

"Short Wave and Television," January 1937, page 537, Short Wave Kink entitled "Portable Antenna."

"Radio-Craft," November 1939, page 284, Article entitled "A Simple Portable Aerial."